United States Patent Office 3,539,547
Patented Nov. 10, 1970

3,539,547
ALKYLENEIMINE ADDUCTS OF TRISACRYLYLHEXAHYDRO - s - TRIAZINE FOR CURING ELASTOMERS
Joseph Adrian Hoffman, Bridgewater Township, Somerville County, N.J., assignor to American Cyanamid Company, Stamford, Conn., a corporation of Maine
No Drawing. Original application Aug. 25, 1966, Ser. No. 574,936, now Patent No. 3,526,625. Divided and this application Oct. 29, 1969, Ser. No. 872,365
Int. Cl. C07d 55/14; C08d 5/02
U.S. Cl. 260—94.7
3 Claims

ABSTRACT OF THE DISCLOSURE 1,3,5 - tris($\beta$ - (alkylaziridinyl)propionyl) - hexahydro-s-triazines of the structure:

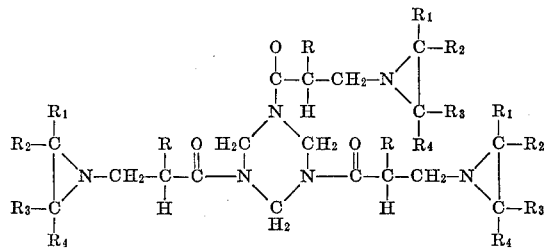

wherein the R's are individually selected from the group consisting of hydrogen and lower alkyl and at least one of $R_1$–$R_4$ is other than hydrogen, and their use as cross-linking agents, particularly for elastomers.

---

This invention relates to and has as its object the provision of a class of new compounds, and from a utility standpoint, to their use as cross-linking agents. More particularly, it relates to 1,3,5-tris($\beta$-(alkylaziridinyl)propionyl)-hexahydro-s-triazines of the structure:

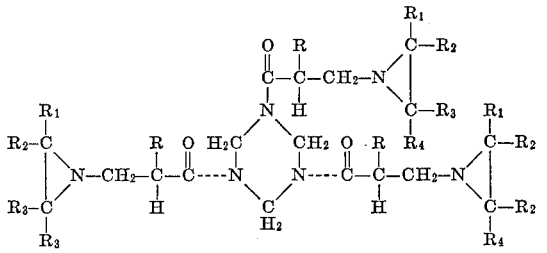

wherein the R's are individually selected from the group consisting of hydrogen and lower alkyl and at least one of $R_1$–$R_4$ is other than hydrogen. It also relates to the use of the compounds of the above structure as cross-linking agents, particularly for elastomers.

The compounds of this invention can be prepared by reacting one mole of a 1,3,5-tris(acrylyl or akylacrylyl)-hexahydro-s-triazine with three moles of an alkyl aziridine. The 1,3,5-tris(acrylyl or alkyl acrylyl)hexahydro-s-triazines may be prepared by reacting formaldehyde with acrylonitrile or alkylacrylonitrile in the presence of concentrated sulfuric acid as described in U.S. Uat. 2,559,835. For example, 1,3,5-tris(methacrylyl)hexahydro-s-triazine may be made by reacting methacrylonitrile with paraformaldehyde in the presence of concentrated sulfuric acid.

The alkylaziridines which may be used include 2-methylaziridine, 2-ethylaziridine, 2,3-dimethylaziridine, 2,2-dimethylaziridine, etc. 2,2,3,3-tetraalkylaziridines may be prepared by the process described in J. Am. Chem. Soc., 82, 6068–70 (1960) and are useful in the present invention.

While three moles of alkylaziridine are required for complete reaction with one mole of 1,3,5-tris(acrylyl or alkylacrylyl)hexahydro-s-triazine, it is preferred to employ an excess of the alkylaziridine, said excess serving to ensure complete reaction and as a reaction medium. The particular amount of excess alkylaziridine is not especially critical since it is stripped from the reaction mixture and recovered. Generally the amount of alkylaziridine will be about double the molar quantity required. The reaction is conveniently carried out at room temperature for about 24 hours after which the excess alkylaziridine is stripped off under vacuum.

Compounds of Formula I are moderately viscous mobile liquids. After removal of excess alkylaziridine, the products are usually of satisfactory purity for normal use as cross-linking agents and are stable for long time periods at room temperatures, without the presence of an inhibitor.

The products of this invention contain three aziridinyl groups and are reactive with monomeric and polymeric compounds having reactive hydrogens, including alcohols, phenols, mercaptans, thiophenols, carboxylic acids, amines, etc. They are thus useful as cross-linking agents in the preparation of plastics and resins, textiles, varnishes, paper, etc. For example, they are effective curing agents for vulcanizable rubbery materials which serve as binders in solid rocket propellant compositions. Rubbery materails include homopolymers of conjugated dienes and copolymers of conjugated dienes with materials copolymerizable therewith, as shown in U.S. Pat. 3,087,843. Of particular interest is their use in propellant compositions comprising an inorganic oxidizing salt and either a synthetic acid-terminated polymeric binder or a synthetic copolymer of a conjugated diene and an unsaturated carboxylic acid (see U.S. Pat. No. 3,087,844). The first type of polymer may be exemplified by the formula:

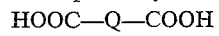

wherein Q is a polymer chain, as for example, a polymer of a conjugated diene such as 1,3-butadiene. The second type of polymer may be exemplified by a copolymer of 1,3-butadiene and acrylic acid.

The compounds of the present invention are extremely useful as curing agents for the rocket propellant compositions described above, where advantage is taken of their liquid nature for ready incorporation therein, and of their comparative slow curing rates for extended "pot-lives."

It is surprising that the compounds of the present invention which contain substituted aziridine groups should have ready solubility in butadiene polymers of the acid terminated type while their counterparts containing unsubsttiuted aziridine groups should not. It is also surprising that the compounds of the present invention should be liquids at normal temperatures while the counterparts containing unsubstituted aziridine groups should not.

To ensure thorough blending of the cross-linking agent with the polymer at temperatures which do not seriously reduce pot-like of the polymer, it is essential that the cross-linking agents be liquid and readily soluble in the polymer at normal temperatures. The compounds containing unsubstituted aziridine groups are solids at ordinary temperatures and are not readily soluble in the polymer. Use of heat to effect solution of the compounds containing unsubstituted aziridine groups reduces pot-life below necessary requirements because of the fast reactivity of this compound type with the polymer even though the compound is not completely dissolved. The utility of compounds containing unsubstituted aziridine groups in the particular polymer type thus is not feasible. The compounds of the present invention, however, under the same conditions of use are readily soluble in the polymer and provide adequate pot-life, i.e., in excess of twelve hours.

The invention is more fully illustrated by the examples which follow. In these examples the parts and percentages are by weight unless otherwise indicated.

EXAMPLE 1

To 342 parts (6 moles) of 2 - methylaziridine in a suitable reactor was added 249 parts (1 mole) of 1,3,5-tris (acrylyl)hexahydro - s - triazine in increments. The reaction mixture was stirred and maintained at 40 to 50° C. during such addition. The addition was complete in about 1–3 hours and the reaction mixture was allowed to remain at room temperature for about 24 hours. The excess aziridine was then stripped off under vacuum and the product obtained as an amber mobile liquid.

EXAMPLE 2

Following the procedure of Example 1 but substituting 426 parts (6 moles) of 2 - ethylaziridine for the 2 - methylaziridine therein, there was obtained a similar product.

EXAMPLE 3

Following the procedure of Example 1 but substituting 426 parts (6 moles) of 2,3 - dimethylaziridine for the 2-methylaziridine therein, there was obtained a similar product.

EXAMPLE 4

Various of the substituted aziridine-containing compounds were evaluated as cross-linking agents in a carboxy-terminated polymer of 1,3 - butadiene by incorporation therein and determining the time for gelation. An unsubstituted aziridine containing compound was compared. The results are given in the table below. Usage of the cross-linking agent was one equivalent per equivalent of polymer.

Table I.—Relative curing rates of various aziridinyl compounds

| Compound: | Time for gelation (hours) |
|---|---|
| Example 1 (2-methyl derivative) | 24 |
| Example 2 (2-ethyl derivative) | 48 |
| Example 3 (2,3-dimethyl derivative) | 36 |
| 1,3,5 - tris (1 - aziridinyl)propionyl hexahydro-s - triazine (prior art compound) (U.S. 2,651,-631) | (¹) |

¹ Not soluble in polymer.

This application is a division of application Ser. No. 574,936 filed Aug. 25, 1966.

I claim:
1. A curable resinous composition which comprises an elastomeric material having reactive hydrogen and a compound of the formula;

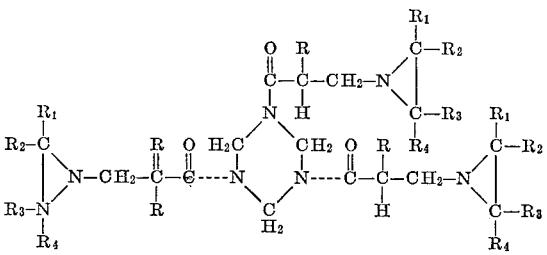

wherein R, R₁, R₂, R₃, and R₄ are each individually selected from the group consisting of hydrogen and lower alkyl and wherein at least one of R₁, R₂, R₃, and R₄ is lower alkyl.

2. A curable resinous composition according to claim 1 above wherein the elastomeric component is carboxy terminated polymer of 1,3-butadiene.

3. A method for cross-linking elastomeric materials which comprises dissolving a compound of the formula;

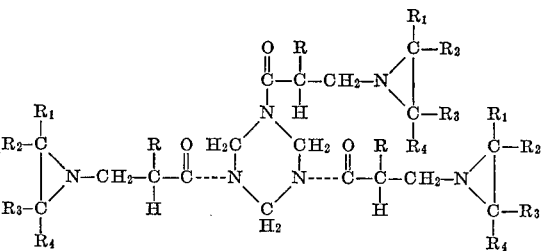

wherein R, R₁, R₂, R₃, and R₄ are each individually selected from the group consisting of hydrogen and lower alkyl and wherein at least one of R₁, R₂, R₃, and R₄ is lower alkyl in liquid form in an equivalent quantity of liquid elastomeric material having reactive hydrogen and curing the same under normal temperature conditions.

References Cited

UNITED STATES PATENTS

| 2,651,631 | 9/1953 | Zerner et al. | 260—248 |
| 3,417,059 | 12/1968 | Hoffman | 260—248 XR |
| 3,434,990 | 5/1969 | Adicoff et al. | 260—94.7 XR |

JOSEPH L. SCHOFER, Primary Examiner

W. F. HAMROCK, Assistant Examiner

U.S. Cl. X.R.

260—78.4, 82.1, 96, 248

UNITED STATES PATENT OFFICE
CERTIFICATE OF CORRECTION

Patent No. 3,539,547  Dated November 10, 1970

Inventor(s) Joseph Adrian Hoffman

It is certified that error appears in the above-identified patent and that said Letters Patent are hereby corrected as shown below:

Column 1, lines 40 to 50, the left-hand portion of the formula reading

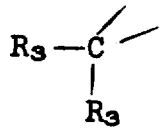  should read  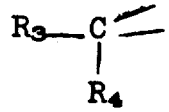

and the right-hand portion of the formula reading

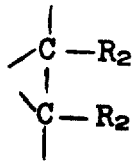  should read  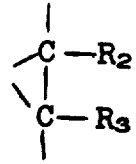

so such formula will correspond with the same formula in the Abstract and Claims; line 62, "U.S. Uat." should read -- U.S. --. Column 2, line 28, "rails" should read -- rials --.

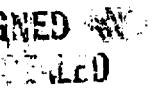

FEB 23 1971

(SEAL)
Attest:

Edward M. Fletcher, Jr.
Attesting Officer

WILLIAM E. SCHUYLER, JR.
Commissioner of Patents